United States Patent [19]

Irie

[11] Patent Number: 5,029,502

[45] Date of Patent: Jul. 9, 1991

[54] METHOD AND APPARATUS FOR CUTTING WIRE-EMBEDDED MEMBER FOR USE IN TIRE

[75] Inventor: Nobuhiko Irie, Nagasaki, Japan

[73] Assignee: Mitsubishi Jukogyo Kabushiki Kaisha, Tokyo, Japan

[21] Appl. No.: 357,594

[22] Filed: May 26, 1989

[51] Int. Cl.⁵ .......................... B26D 1/18; B26D 5/00
[52] U.S. Cl. ........................................ 83/49; 83/52;
    83/56; 83/72; 83/555; 83/578; 83/614;
    83/486.1; 364/473
[58] Field of Search .................. 83/49, 52, 56, 486.1,
    83/487, 471.1, 471.3, 555, 578, 614, 62, 62.1, 63,
    72; 364/474.34, 473

[56] References Cited

U.S. PATENT DOCUMENTS

| | | | |
|---|---|---|---|
| 3,732,767 | 5/1973 | Habert | 83/582 |
| 4,608,890 | 9/1986 | Still et al. | 83/49 |
| 4,857,123 | 8/1989 | Still et al. | 83/56 |
| 4,858,505 | 8/1989 | Still et al. | 83/49 |
| 4,913,018 | 4/1990 | Bailey | 83/155 |

FOREIGN PATENT DOCUMENTS

2506217 8/1975 Fed. Rep. of Germany .

Primary Examiner—Hien H. Phan
Attorney, Agent, or Firm—Wenderoth, Lind & Ponack

[57] ABSTRACT

The present invention is drawn to a method an an apparatus for cutting a sheet member embedded with wires for use in tire, having the following characteristics. That is, a wire-embedded member is cut with a rotatable cutter at the middle of the member in a width-wise direction thereof while applying a pushing force, effected by a high pressure, on the cutter. The cutter is shiftably and rotatably mounted on a frame so as to be movable in a shifting direction while rotating. The cutter movement may also deviate in a direction orthogonal to the shifting direction thereof. The completion of the cutting at the middle of the member is detected by an electrical connection between the cutter and a support member, which connection is confirmed by a confirmation control mechanism. The cutter is shifted by a pushing mechanism from the middle to one side edge of the sheet member under a pushing force, effected by a pressure lower than that of the high pressure, so as to carry out a first half of a cutting operation. The cutter is then returned to the middle under a force effected by pressure even lower than that effecting the pushing force. The cutter is shifted again from the middle to the other side edge of the sheet member under a pushing force effected by a pressure equal to that generated during the first half of the cutting operation so as to carry out a second half of the cutting operation. The cutter is then raised after the completion of the cutting operation and is returned to the middle in preparation for the next operation. The pushing and the shifting of the cutter is controlled by a suitable control device.

7 Claims, 5 Drawing Sheets

METHOD AND APPARATUS FOR CUTTING WIRE-EMBEDDED MEMBER FOR USE IN TIRE

BACKGROUND OF THE INVENTION

1. Field of the Invention

The present invention relates to a method and an apparatus for cutting a sheet member having a wire embedded therein, such as a steel breaker ply, a steel chafer, a steel carcass and the like for use in the production of a tire.

2. Description of the Related Art

For example, Japanese Utility Model Publication No. 1987-13779 discloses a cutting apparatus which comprises a disk-shaped cutter provided above a conveyance path for a rubber sheet, and a cutter support bar disposed so as to be vertically movable and shiftable in a bias direction. The rubber sheet is cut from one side edge to the other side edge thereof by shifting the cutter in a direction orthogonal to the direction of the movement of the cutter support bar. But, the apparatus doesn't detect an error in the cutting angle and issue a warning.

For producing a tire with good precision, it is required to feed a tire forming machine with a tire rubber sheet cut very accurately.

Particularly, since a rubber sheet such as a breaker ply, a chafer, a carcass ply and the like is provided with twisted piano wires therein, the final tire product is adversely affected when the size of the sheet is inaccurate thereby causing dynamic disproportion in the tire.

Because the wires are cut at the opposite side edges in a width-wise direction of such a wire-embedded rubber sheet, the opposite side edges of the rubber sheet are covered to the extent of 10~20 mm with a raw rubber tape of 0.5~1.0 mm in thickness, referred to as edge rubber, so that the side edges are thicker than the other portions of the sheet.

Generally, a carcass ply and the like are provided at their middle portions, namely in the range of 50~70% of their width, with another rubber sheet of 0.5~1.0 mm in thickness adhered thereto.

Accordingly, when the cutter of the above-mentioned conventional cutting apparatus is placed on the wires at the side edge of the rubber sheet to be cut first, the ends of the wires tend to be untwisted. After shifting a while, the cutter tends to be diverted to a rubber layer having no wires due to the resistance of the wires. Otherwise, the cutter tends to become incapable of shifting laterally due to a large viscosity resistance of the thick rubber portion. Thereupon, cutting faults are occasionally caused at the side edge of the rubber sheet.

When being shifted from the one side edge of the sheet to the middle portion thereof, the cutter tends to rise in the transition portion of the sheet from the thin portion to the thick portion due to the increasing thickness of the rubber layer, thereby shifting without completing the cutting.

Further, the conventional cutting apparatus is incapable of automatically detecting the above cutting faults.

On the other hand, automation is highly desirable in the tire forming line. More specifically, an automatic cutting of the above-mentioned three kinds of rubber sheets, an automatic mounting thereof around a forming drum, an automatic piling of tire constituent materials around the rubber sheet already mounted around the drum and an automatic joining of the forward end and the rear end of the rubber sheet mounted therearound are highly desirable.

For accomplishing these automatic operations, it is necessary to always feed the rubbers sheets stably and accurately. Nowadays, a compensation mechanism or a control method for compensating for a variation in the width of the sheet has been proposed for attaining good accuracy, but no countermeasures for correcting an error in the cutting angle have been taken. The above-mentioned wire-embedded rubber sheets are produced carefully so that the wires are kept at a constant angle during production. But sometimes the wire angles are disarranged by the winding of the rubber sheet carried out for the storage or the feeding thereof. For ensuring the quality of a tire, the forward end and the rear end of the wire-embedded rubber sheet mounted around the drum should not be joined in a state in which the respective wires in the forward end and in the rear end intersect each other at the joined portion. In order to avoid such an intersection, the parallelism between both the wires in the forward end and those in the rear end should be maintained within a suitable tolerance.

This condition will become more comprehensible by the following explanation.

Figure 7:
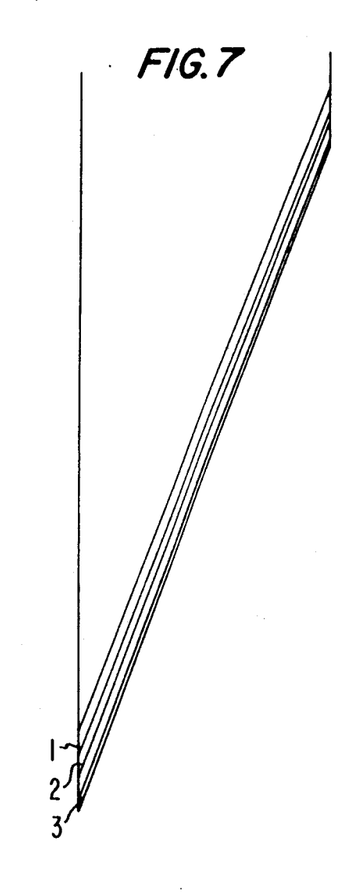
FIG. 7 is an explanatory view showing the forward end and the rear end of a breaker ply after being cut.

FIG. 7 shows the forward end and the rear end of a breaker ply after completion of the cutting. Only two wires are illustrated in an abbreviated manner. In the drawing, a black section 1 designates a twisted wire, and a white section 2 designates a rubber layer. A white section 3 designates a part of the rubber layer separated by the cutting, having an area about half that of the white section 2.

Figure 8:
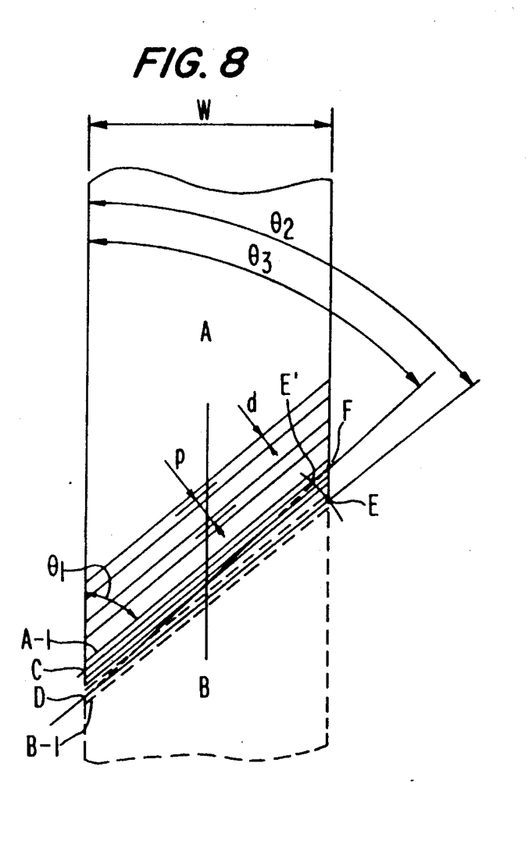
FIG. 8 is an explanatory view showing angle errors in the forward end and in the rear end of the rubber sheet mounted around a forming drum.

FIG. 8 is an explanatory view illustrating the tolerance for an error of the angles defined respectively by the forward end and in the rear end of a rubber sheet (the forward end is indicated with a solid line and the rear end is indicated with a broken line).

The symbols employed throughout these figures will be explained hereinafter:

- p: pitch between wires embedded in the rubber sheet,
- d: diameter of wire embedded therein,
- $\theta_1$: angle of wire nearest to the forward end of the sheet
- $\theta_2$: angle of wire nearest to the rear end thereof,
- $\theta_3$: tolerance in the angle of the rear end of the sheet,
- W: width of the rubber sheet.

The forward end portion of the rubber sheet is indicated with the symbol A, and the wire nearest to the cutting line is indicated with the symbol A-1. The rear end portion thereof is indicated with the symbol B, and the wire nearest to the cutting line is indicated with the symbol B-1. The center of the wire A-1 is indicated with the symbols of C and F at the opposite sides, and the center of the wire B-1 is indicated with the symbols of D and E.

In a best or ideal condition, a parallelogram is defined by lines connected at the symbols of C, D, E and F with $\theta_1 = \theta_2$ as well as $\overline{CD} = \overline{EF} = p/\sin\theta_1$.

Even though the positions represented by symbols C and D can be actually located as illustrated in FIG. 8, the center E of the wire B-1 is often shifted to the point E due to an error in the angle. That is, the wire B-1 is not always disposed along the line $\overline{DE}$, but is often disposed nearly along the line $\overline{DE'}$. When carrying out a pressing operation of the end portions with a splice roll after the completion of the joining of the end portions, the present inventor has found out from experiments that a correction for an intersection between both the wires A-1, B-1 becomes more difficult as the center line of the wire B-1 gets nearer to line $\overline{DE'}$.

By exemplifying how large of a difference can arise between the angle $\theta_2$ of the wire B-1 and the angle $\theta_1$ of the wire A-1 the importance of the present invention will become more comprehensible.

Now, one example of a radial tire for a passenger car has the following dimensions:
d = 0.68 mm
p = 1.40 mm
W = 200 mm
$\theta_1 = 20°$,
$\overline{DE} = \overline{DE'} = W/\sin \theta_1 = 200/\sin 20° = 584.76$ (mm).

When taking p = 1.4 mm as a maximum tolerance in the line $\overline{EE'}$, an allowable angle error $\angle E'DE = \theta'$ becomes 0.034° because $2 \times 584.76 \cdot \sin(\theta'/2) = p = 1.4$.

That is, an angle difference between both wires A-1, B-1 for preventing the intersection therebetween becomes about ±0.03°. Certainly, a smaller value may be derived according to the values of those W, $\theta$ and p.

Consequently, it is quite possible that a variation to such a degree may be caused before the rubber sheet is fed to the forming drum even when the rubber sheet is produced under strict production management.

SUMMARY OF THE INVENTION

The present invention is directed to solving the problems noted above, and has as its object to provide a method and an apparatus for cutting a wire-embedded member for use in a tire, in which the wire-embedded member can be cut at a predetermined angle even when the member is deformed whereby highly reliable cutting and joint operations can be carried out.

One of the principal features of the invention is the provision of a method and an apparatus for cutting a wire-embedded member for use in a tire in which a cutter is adapted to start cutting at the middle of a wire-embedded member in a width-wise direction thereof.

Another of the principal features of the invention is the provision of such a method and an apparatus in which the completion of the cutting is adapted to be judged by an electrical connection between the cutter and a sheet support member and in which such cutting may be carried out again as required.

Yet another of the principal features of the invention is the provision of such a method and an apparatus in which a variation of the cutting angle is adapted to be detected by measuring the amount that the cutter shifts in a shifting direction thereof and by measuring the amount of rotation of the revolution shaft thereof.

In the present invention, the sharp-pointed end portion of the wire-embedded member is formed correctly and at an acute angle by the cutting operation regardless of a variation in the thickness of a rubber sheet for a tire, a proper cutting depth is judged by the electrical connection, the cutting is carried out again in the case of an improper cutting depth, and the most suitable cutting speed and the most suitable pushing force for effecting the cutting operation is controllable along the cutting line according to a variation in the thickness of the rubber sheet and to the range of the variation.

Further, the inspection of the cutting angle is adapted to be carried out by the cutting apparatus during the cutting of the rubber sheet. The inspection of the cutting angle includes two kinds of inspections, one of which is carried out by comparing a measured angle value with a design value suitable to a tire constitution and the other of which is carried out by comparing the difference between both angles of the forward and rear ends of the rubber sheet mounted around a forming drum with a tolerance defined for preventing the wires at the ends from intersecting at the time of joining the ends together. The measured angle values in the former inspection are stored as data of the respective tires to be used in the correlation of data obtained by a uniformity machine during the product inspection of the finished tires.

BRIEF DESCRIPTION OF THE DRAWINGS

FIGS. 6(a) through 6(d) are explanatory views showing cutting procedures;

DETAILED DESCRIPTION OF THE PREFERRED EMBODIMENT

A breaker ply servicer will be described with reference to FIGS. 1 through 6.

However, it should be noted that a steel chafer servicer is similar to the breaker ply servicer. And, a carcass servicer has a constitution similar thereto except in that a very wide conveyor apparatus is employed and in that a cutting angle is made orthogonal to a feeding direction of the carcass in a cutting apparatus of the carcass servicer. Therefore, it will be readily understood that the present invention is applicable to such servicers.

Figure 1:
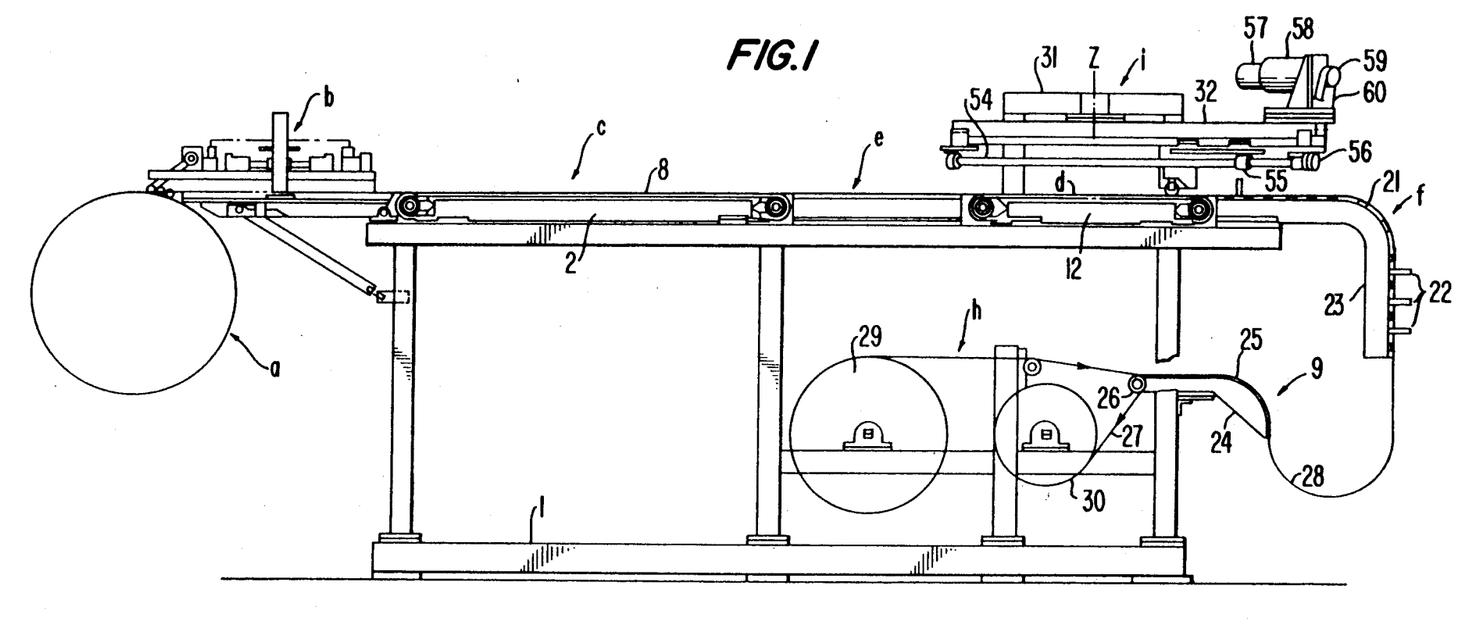
FIG. 1 is a general side view of a breaker ply servicer to which the present invention is applied.
Figure 2:
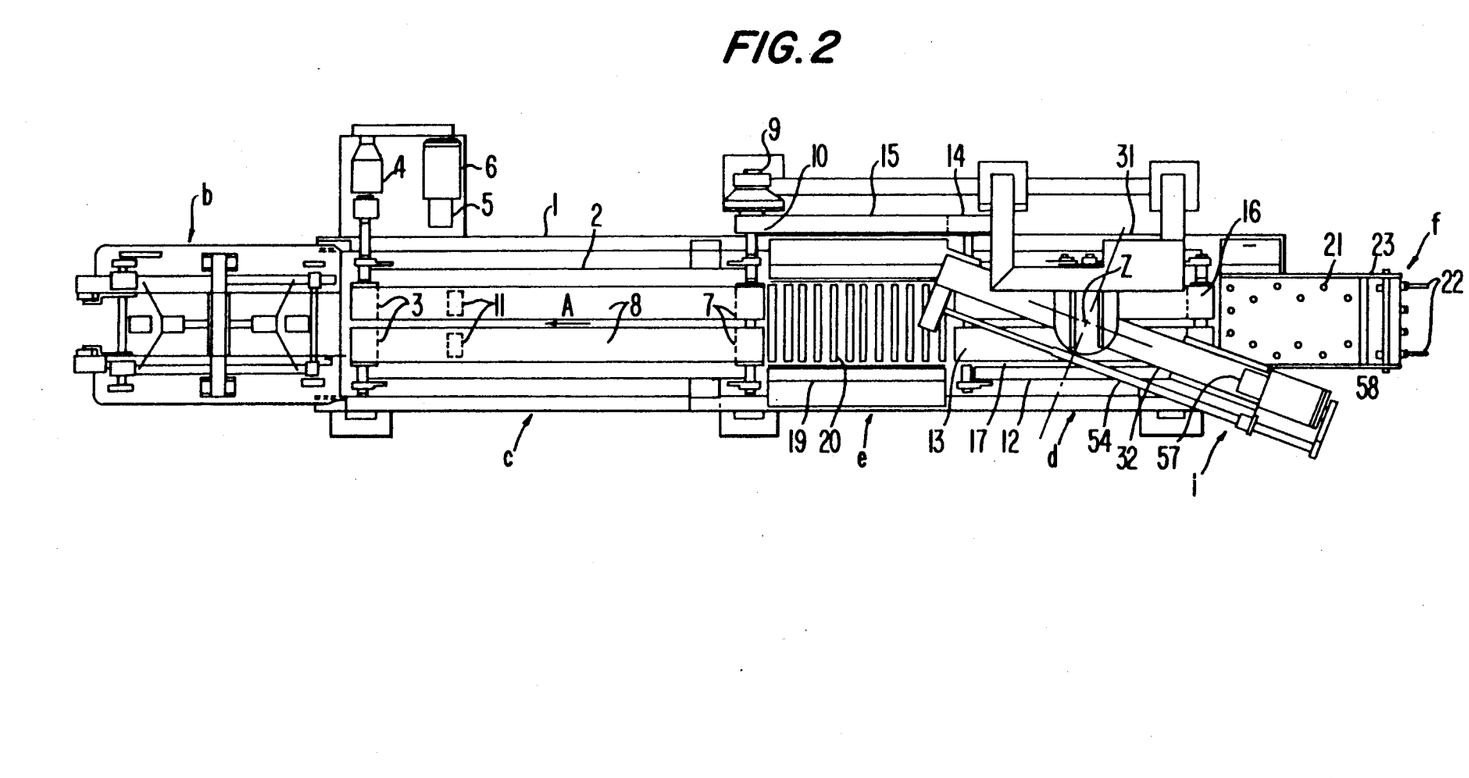
FIG. 2 is a plan view of the servicer of FIG. 1.

In FIGS. 1 through 6, symbol a designates a forming drum for a breaker ply comprising a known expansible and contractible drum. Symbol b designates a conventional centering and pasting device for the breaker ply. And symbol c designates a feeding conveyor referred to below as a first conveyor. As shown in FIGS. 1 and 2, the first conveyor c comprises a conveyor frame 2 supported on a common base frame 1, a toothed drive roller 3 rotatably supported on the frame 2 and connected to a reduction gear 4, a drive motor 6 provided with a pulse transducer 5, a toothed roller 7 arranged in parallel with the drive roller 3, a toothed belt 8 looped around the rollers 3, 7, a clutch 9 connected to the roller 7 and a gear 10 arranged coaxially with the clutch 9. A suitable number of permanent magnets 11, shown in outline form, are arranged on the frame 1 beneath the toothed belt 8.

Figures 5A, 5B, 5C:
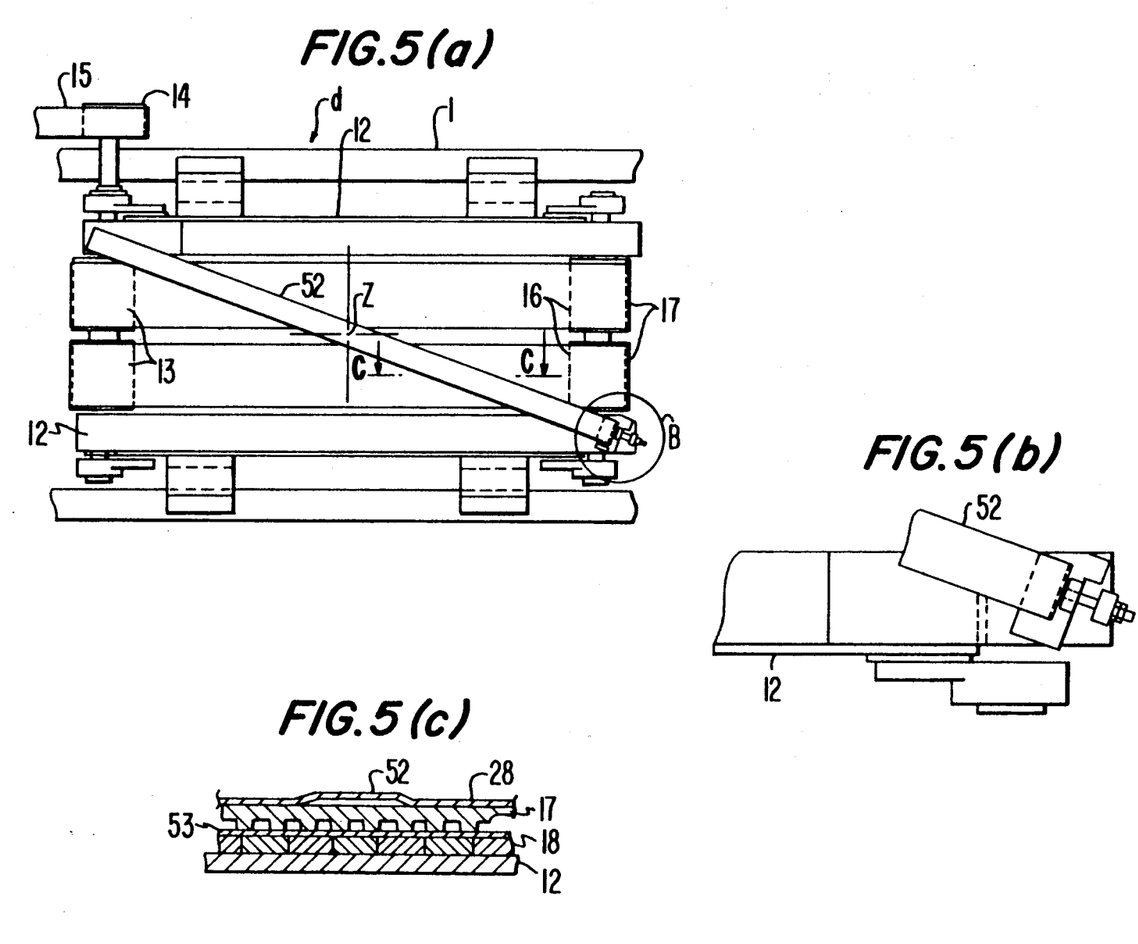
FIG. 5(a) is a plan view of a third conveyor of the servicer of FIG. 1.
FIG. 5(b) is an enlarged view of the portion B in FIG. 5(a)
FIG. 5(c) is a sectional view taken along line C—C in FIG. 5(a)

Symbol d designates a feeding conveyor device referred to below as a third conveyor. As shown in FIG. 5, the third conveyor device d comprises a conveyor frame 12 supported on the common base frame 1, a toothed drive roller 13 rotatably supported on the frame 12 and provided coaxially with a gear 14, a toothed belt 15 looped around the gears 10, 14, a toothed roller 16 arranged in parallel with the roller 13, and a toothed belt 17 looped around the rollers 13, 16. The frame 12 is provided at an appropriate location with a steel belt 52 disposed under tension in a shifting direction of the cutter 46. In order to tension the steel belt 52, the frame 12 is provided with a known tension device at B (refer to FIG. 5(b)). The steel belt 52 is kept in contact with the toothed belt 17 (refer to FIG. 5(c)). The toothed belt 17 is adapted to slide on a non-magnetic plate 53 which is placed on magnets 18 arranged on the conveyor frame 12. The plate 53 is disposed so as to support the belt 17 stably while the cutter 46 shifts while cutting a rubber sheet 28.

Symbol e designates a feeding conveyor referred to below as a second conveyor. As shown in FIG. 2, the second conveyor e comprises a conveyor frame 19 supported on the common base frame 1 and a plurality of parallel free rollers 20. The length of the second conveyor e is sufficient to accommodate that portion of the rubber sheet over which the cut line extends.

Symbol f designates a feeding conveyor referred to below as a fourth conveyor. As shown in FIG. 1, the fourth conveyor f comprises a plurality of universal bearings 21, vertical rollers 22 disposed at appropriate locations and adjustable in a width-wise direction, and a conveyor frame 23 supported on the common base frame 1.

Symbol g designates a feeding conveyor referred to below as a fifth conveyor. As shown in FIG. 1, the fifth conveyor g comprises a conveyor frame 24 supported on the common base frame 1, freely rotatable rollers 25 and a separation roller 26.

Symbol h designates a let-off device provided with a rubber sheet roll 29 on which a liner 27 is wound together with the breaker ply 28, a liner take-up roll 30, and with a known drive device and a brake device.

Figure 3:
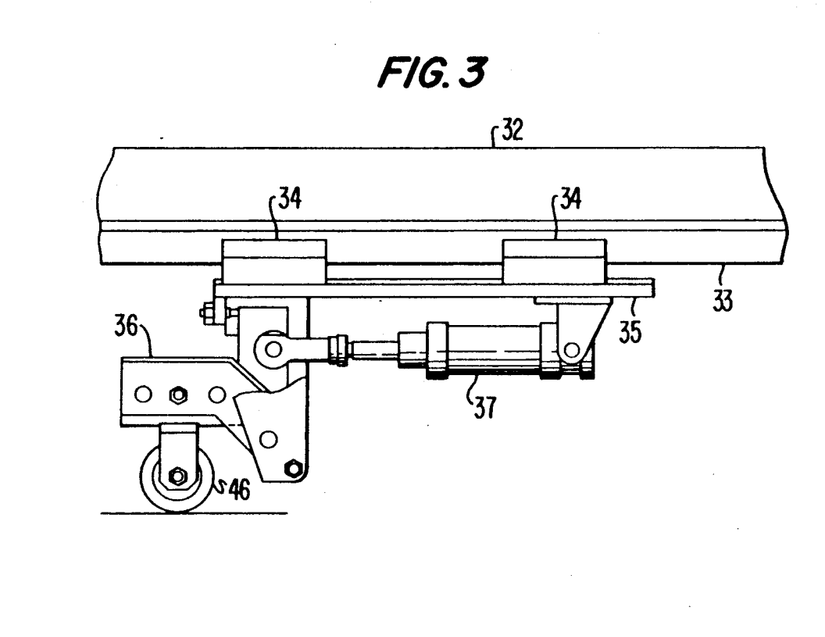
FIG. 3 is a side view of a cutting apparatus in the servicer of FIG. 1.
Figure 4:
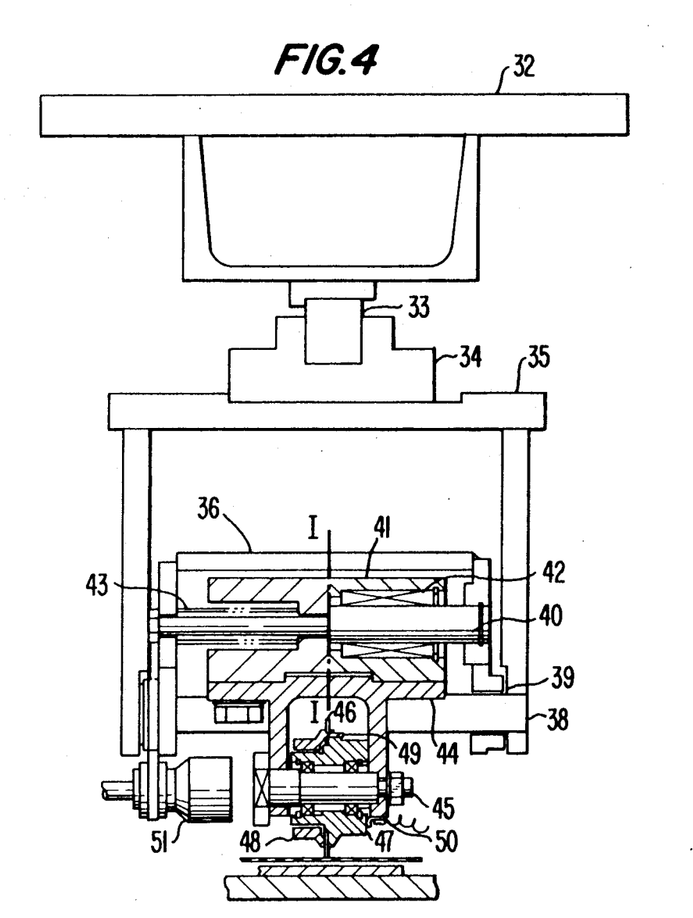
FIG. 4 is a front view of the cutting apparatus of FIG. 3 as viewed in a direction in which a cutter will shift.

Symbol i designates a cutting apparatus. As shown in FIGS. 2 through 4, the cutting apparatus i comprises a frame 31 supported on the common base frame 1, a sub-frame 32 suspended pivotally about the center Z of the servicer, a rail 33 constituting a linear bearing member attached to the underside of the sub-frame 32, bearing nuts 34 mounted on the rail 33, a bracket 35 attached to the bearing nuts 34, an arm 36 and a swing-actuation cylinder 37 mounted swingably to the bracket 35 through shafts 38 and bushings 39, two shafts 40 disposed in parallel with each other in the arm 36, linear bearing members 42 through which a block 41 is mounted around the shafts 40, and two springs 43 provided around the shafts 40 and extending to the midportions thereof. The two springs 43 have the same spring constant and exert a suitable force, respectively. The block 41 is shown in FIG. 4 in section with the shaft 40 portion and of the spring 43 portion shown to the right and left of axis I—I. Owing to this constitution, the block 41 is supported neutrally on the shafts 40 by the right and left springs 43 so as to be displaceable by a lateral force and so as to be able to be returned to the neutral position after the lateral force is relieved. Further the block 41 is provided with a cutter support 44, which is preferably made of plastic material or the like so as to provide electrical insulation. Cutter holders 47, 48 are rotatably supported by the cutter support 44 through a shaft 45. A cutter 46 is secured between the holders 47, 48 and is fixed to the holder 47 by a stopper pin 49. The cutter support 44 is provided at a suitable location thereon with an electrode brush 50 adapted to be kept in contact with the holder 47 during its rotation. A shift distance detecting sensor 51 is attached to the arm 36 coaxially with shaft 45. The sub-frame 32 is provided with a threaded rod 54 disposed in parallel with the rail 33 and rotatably supported on sub-frame 32. A nut 55 (FIG. 1) engaged with the threaded rod 54 is fixedly secured to the bracket 35 at a suitable location. The rod 54 is provided at its one end with a gear 56 which is adapted to be driven by a gear 59 through a toothed belt 60. The gear 59 is fixed to an output shaft of a motor 58 mounted on the sub-frame 32 and provided with a pulse transducer 57.

According to the above-mentioned constitution, an absolute angle of the cutting line can be calculated from the output of the sensor 51 shifting together with the cutter 46 and from the output of the pulse transducer 57, and which detected angle can be stored so that a difference therebetween with the next cutting line can be calculated and it can be judged whether such a difference is within a predetermined angle tolerance.

Now, the operation of the apparatus according to the present invention will be explained hereinafter.

The breaker ply 28 fed out from the let-off device h is moved to be taken up by the drum a at the pasting device b by the fifth, the fourth, the third, the second and the first conveyors. Firstly, when the leading end of the breaker ply 28 passes a little beyond the cutting point Z, the feeding is stopped and the cutting is started. The cutting steps will be explained in detail later. The cut-out piece is removed manually by an operator. Thereupon, the automatic operation is ready to start.

(1) The breaker ply 28 is fed a predetermined distance.

At this time, the clutch 9 is kept in the engaged condition so that the conveyor devices c, d can be driven simultaneously by the motor 6. The feeding length is controlled by the pulse transducer 5.

(2) When the counted pulses reach a predetermined value, the motor 6 is stopped so as to stop both of the conveyor devices.

(3) The cutter 46 is lowered by the cylinder 37 at the cutting point Z. Thereupon, the cylinder 37 is supplied with a high pressure working fluid so as to exert a force large enough to lower the cutter 46 even in the case where the cutter 46 is placed above the wire embedded in the breaker ply 28. In this case, the cutter 46 will exhibit the following four kinds of behaviors.

Figure 6A:
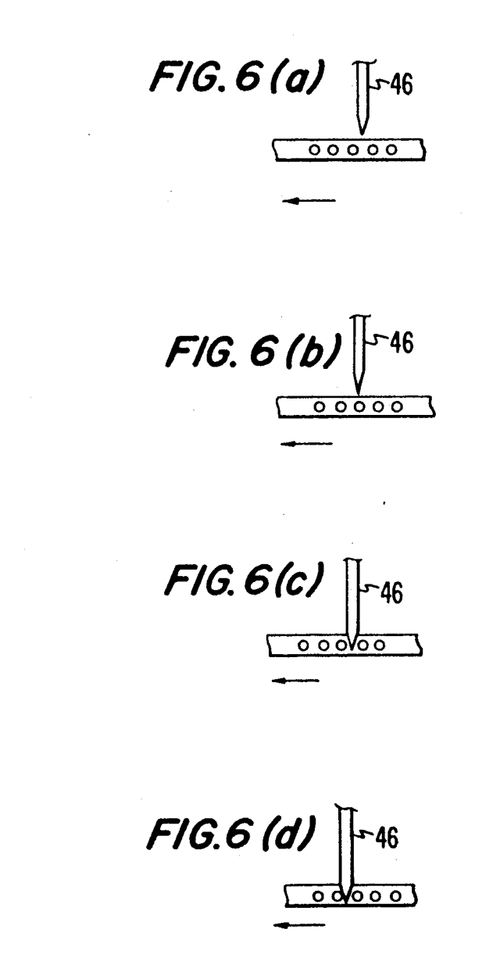

In FIG. 6(a), when the cutting point Z is positioned just midway between an adjacent pair of wires, the cutter 46 penetrates the rubber layer as it is.

In FIG. 6(b), when the wire is located just below the cutter 46, the cutter 46 is placed on the wire without any diversion. Otherwise, as shown in FIG. 6(c), the cutter 46 is diverted to the rear side of the wire and then penetrates the rubber layer (in this case, the breaker ply will be cut longer by about ½ of a wire pitch). Still otherwise, as shown in FIG. 6(d), the cutter 46 is diverted to the forward side of the wire and then penetrates the rubber layer. In the drawings, the arrow indicates the feeding direction.

(4) The cutting apparatus judges automatically which behavior the cutter 46 has exhibited and then performs the following functions.

(4-1) In the case shown in FIG. 6(a), when the cutter 46 and the steel belt 52 are electrically conductively connected after the penetration of the cutter 46, an electrical connection signal is issued whereupon the output from the sensor 51 is, at that time, stored as a starting value for the angle calculation. Then, the working fluid supplied to the cylinder 37 is diverted so as to exert a cutting pressure by which the cutter 46 is shifted to the side edge of the breaker ply 28 so as to carry out the first half of the cutting operation. The stopper position of the cutter 46 is set by the pulse transducer 57 in which a desired stopped position has been previously inputted. An angle difference is calculated by the difference between the starting value and the output of the sensor 51 at the stopping position as determined by the pulse counts during shifting. The sum of the preset cutting angle, namely the setting angle of the sub-frame 32, and the angle difference is stored as the cutting angle of the first half of the forward end of a ply number N. Then the cutter 46 is returned to the cutting point Z under pressure lower than the cutting pressure. In order to extend the cutting service life, the pressure is reduced so as to prevent an inefficient pushing during the return of the cutter along the separated cut edges. When the cutter 46 immediately approaches the cutting point Z, the pressure is increased to the cutting pressure. Then, the cutter 46 carries out the remaining half (the second half) of the cutting operation and stops. The stopping position is detected by the pulse transducer 57 in which the desired position has been previously inputted. The cutting angle variation of the second half is calculated by the difference between the output of the sensor 51 at this stopping position and the output stored at the cutting point Z as determined by the pulse counts during shifting. The sum of the preset cutting angle, namely the setting angle of the sub-frame 32, and the angle difference is stored as the cutting angle of the second half of the forward end of ply number N. After stopping, the cutter 46 is raised and returned to the cutting point Z in preparation for the next cutting operation.

(4-2) Because the standard time from the commencement of the lowering of the cutter to the completion of the penetration of the sheet by the cutter can be previously estimated and employed in the control system at the design stage, the fact that the cutter 46 has been disposed over the wire as shown in FIG. 6(b) can be determined when the cutter 46 and the steel belt 52 are not electrically connected within a predetermined time. Based on this judgement, the breaker ply 28 at the cutting position is moved nearly to the state shown in FIG. 6(a) by the reversing of the motor 6. In order to nearly arrive at the state shown in FIG. 6(a), the reversing of the motor 6 is controlled by the pulse transducer 5 so as to move the ply 28 about ½ of a wire pitch. After the completion of such a reversing operation, the cutting apparatus functions similar to the procedure described in the item (4-1) according to FIG. 6(a).

(4-3) The sensor 51 can also detect the case in which the cutter 46 is deviated to the rear side of the wire as shown in FIG. 6(c). By this detection signal, the cutter 46 is raised for a moment and then the conveyor driving motor 6 is reversed so as to function similarly to the procedure described in item (4-2).

(4-4) The sensor 51 can also detect the case in which the cutter 46 is deviated to the forward side of the wire as shown in FIG. 6(d). In this case, the deviation corresponds to about ½ of a wire pitch and the reversing of the conveyor is not carried out whereby an operation similar to the procedure described in item (4-1) is carried out.

(5) During the cutting operation, the electrical connection with the steel belt 52 is checked while the cutter 46 is shifted. In the case in which the electrical connection is confirmed during the entire cutting operation, the procedure described in item (4-1) is carried out. In the case in which the electrical connection is not confirmed, the following procedure is performed. That is, when the electrical connection is interrupted during the first half of the cutting operation, the cutting pressure is not changed over to a low pressure at the side edge of the breaker ply 28 but is maintained during the return of the cutter to the middle cutting point so as to doubly make sure that the cutting operation has been carried out. In the case in which the electric connection is not confirmed during the second half of the cutting operation, the cutter 46 is not raised at the side edge, is again returned to the middle cutting point with the cutting pressure as it is and is raised at the middle cutting point Z.

(6) After that, the motor 6 is operated again so that both of the conveyor devices c, d are operated simultaneously.

(7) The breaker ply is advanced together with the cut off one. When the cutting line reaches the conveyor device e, the conveyor is stopped momentarily. After the disengagement of the clutch 9, the motor 6 is operated again so as to operate only the conveyor device c normally. Therefore, the breaker ply 28 to the rear of the cutting line remains on both of the conveyor devices e, d.

(8) The cut off ply advanced by the conveyor c is taken up by the drum a through the pasting device b, while the circumferential speed of the drum a and the linear speed of the conveyor c are controlled by a known control means so as to be precisely synchronized.

(9) After the cut off ply is taken up by the drum a from the conveyor c, the breaker ply on both of the conveyors e, d is advanced whereby the apparatus is readied for the next cutting cycle. At this time, the clutch 9 is engaged so that both of the conveyors c, d are operated synchronously. After feeding the breaker ply a predetermined distance, the motor 6 is stopped and then the cutting apparatus carries out the cutting operation at the rear end of the ply number N (namely, at the forward end side of the ply number (N+1)). When the rear end of the ply number N is cut, the cutting angle of the first half of the rear end of the ply number N and the second half of the rear end of the ply number N are calculated based on the output of the sensor and are stored. The difference between the cutting angle of the first half of the forward end of the ply number N and the cutting angle of the first half of the rear end of the ply number N, and the difference between the cutting angle of the second half of the forward end of ply number N and the cutting angle of the second half of the rear end of the ply number N are judged as to whether such differences are within a certain tolerance. If they are within the tolerance, the automatic operation is continued. If they are not within the tolerance, an alarm is sounded and the automatic operation is stopped temporarily so that an inspection can be carried out by an operator.

It will be apparent to those skilled in the art that many modifications and changes in the method and the apparatus set forth will be possible without departing from the scope and spirit of the invention.

What is claimed is:

1. A method of cutting a sheet member having wires embedded therein for use in tire, said method comprising the steps of:
   (a) disposing the sheet member on an electrically conductive support member;
   (b) cutting the sheet member with a rotatable electrically conductive cutter at the middle of the sheet member, as taken in a width-wise direction thereof, under a pushing force effected by applying a high pressure on the cutter;
   (c) detecting whether there has been a complete penetration of the rotatable cutter through the middle of the sheet member by applying a voltage across the cutter and the support member to detect whether a direct electrically conductive connection has been established between the cutter and the support member on which the sheet member is supported;
   (d) shifting the cutter from the middle of the sheet member to one side edge thereof under a pushing force effected by applying a pressure lower than said higher pressure on the cutter so as to carry out a first half of a cutting operation;
   (e) returning the cutter to the middle of the sheet member under a force effected by applying pressure on the cutter lower than that used to effect the pushing force;
   (f) shifting the cutter from the middle of the sheet member to the other side edge thereof under a pushing force effected by applying pressure on the cutter equal to that applied in step (d) so as to carry out a second half of the cutting operation;
   (g) raising the cutter after the completion of the first and second halves of the cutting operation and returning the cutter to the middle of the sheet member in preparation for the next cutting operation.

2. A method as defined in claim 1, wherein the first half of the cutting operation and the second half of the cutting operation are carried out while detecting whether the electrically conductive connection between the cutter and the support member is established.

3. A method as defined in claim 2, wherein when the electrically conductive connection is not detected during the first half of the cutting operation, the pressure applied on the cutter is maintained at the same high pressure as that employed in step (d) during the return of the cutting to the middle of the sheet member so as to complete the first half of the cutting operation, and when the electrically conductive connection is not detected during the second half of the cutting operation, the raising of the cutter is cancelled and the cutter is returned to the middle of the sheet member by applying the high pressure on the cutter so as to complete the second half of the cutting operation.

4. A method as claimed in claim 1, wherein the first half of the cutting operation and the second half of the cutting operation respectively comprise the following steps:
   measuring a distance over which the cutter has shifted and determining a lateral deviation thereof from a predetermined direction of shifting;
   calculating an angle at which a wire is embedded in the member by values obtained in said measuring step and storing data representative of the angle;
   judging whether the angle of the wire is within a certain tolerance by comparing the calculated angle with a predetermined reference value; and
   stopping the shifting of the cutter when the calculated angle is not within the tolerance.

5. An apparatus for cutting a sheet member having a wires embedded therein for use in a tire, said apparatus comprising:
   (a) an electrically conductive cutter shiftably and rotatably supported in the apparatus so as to be shiftable along a shifting direction while rotating and so as to be able to deviate from the shifting direction in a direction orthogonal to the shifting direction;
   (b) an electrically conductive support member disposed under the cutter and oppositely thereto for supporting the sheet member to be cut;
   (c) a pushing means for moving the cutter toward and away from the support member;
   (d) a confirmation means for confirming whether a direct electrically conductive connection has been established between the cutter and the support member, said confirmation means including voltage means for applying a voltage across said cutter and said support member; and
   (e) a control means for controlling the pushing means and the shifting of the cutter.

6. An apparatus as defined in claim 5, wherein said apparatus further comprises:
   a measurement means for measuring the amount of movement of the cutter over the shifting direction and determining the amount of lateral deviation therefrom;
   a calculation and storage means for calculating an angle of a wire embedded in the member by the values measured by the measurement means and for storing data representative of the angle;
   a judgement means for comparing the calculated angle with a predetermined reference value and judging whether the difference obtained by the comparison is within a certain tolerance; and
   a stop means for stopping the shifting of the cutter when the difference is not within said certain tolerance.

7. An apparatus as defined in claim 5, wherein said cutter is mounted on a cutter support, said cutter support is mounted in the apparatus so as to be slidable in directions orthogonal to said shifting direction, and spring means are provided for urging said cutter support to a predetermined location and for allowing said cutter support and the cutter supported thereon to be slid against the urging force of said spring means by an external force applied to said cutter.

* * * * *